United States Patent
Sweeney et al.

(10) Patent No.: US 10,055,083 B2
(45) Date of Patent: Aug. 21, 2018

(54) PREDICTIVE TARGET ENLARGEMENT

(71) Applicant: Dassault Systemes SolidWorks Corporation, Waltham, MA (US)

(72) Inventors: John Sweeney, Acton, MA (US); Thomas M. Spine, Londonderry, NH (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 754 days.

(21) Appl. No.: 14/531,700

(22) Filed: Nov. 3, 2014

(65) Prior Publication Data
US 2015/0058800 A1 Feb. 26, 2015

Related U.S. Application Data

(63) Continuation of application No. 12/793,495, filed on Jun. 3, 2010, now Pat. No. 8,910,078.
(Continued)

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0482* (2013.01); *G06F 3/04842* (2013.01); *G06F 2203/04807* (2013.01)

(58) Field of Classification Search
CPC ....... G06F 3/0481; G06F 3/0482; G06F 3/048
See application file for complete search history.

(56) References Cited

U.S. PATENT DOCUMENTS 5,736,974 A * 4/1998 Selker ................ G06F 3/04895
345/157
6,323,884 B1 * 11/2001 Bird .................... G06F 3/04812
715/810
(Continued)

FOREIGN PATENT DOCUMENTS

JP 11-212727 8/1999
JP 2002-091677 3/2002
(Continued)

OTHER PUBLICATIONS

Michael J. McGuffin and Ravin Balakrishnan, Fitt's Law and Expanding Targets: Experimental Studies and Designs for User Interfaces, Dec. 2005, ACM Transaction on Computer-Human Interactions, vol. 12, No. 4 pp. 388-419.*
(Continued)

*Primary Examiner* — Jeanette J Parker
(74) *Attorney, Agent, or Firm* — Hamilton, Brook, Smith & Reynolds, P.C.

(57) ABSTRACT

Techniques for aiding user input with a graphical user interface (GUI) are disclosed. A target object among various command regions of the GUI is predicted, e.g., substantially before the cursor reaches any of the regions. The command region corresponding to the predicted target object is enlarged to facilitate user selection of the predicted target object. Enlarging the predicted target object may cause the target object to overlap and/or occlude nearby command regions. After a first target object is predicted, the prediction may be changed based on updated cursor movements. By using predictive target enlargement, users are given early visual feedback about the target, and are given a larger target to acquire, thereby allowing them to be faster and less precise (their mouse direction can wander) yet still acquire their desired result.

19 Claims, 7 Drawing Sheets

Related U.S. Application Data

(60) Provisional application No. 61/217,934, filed on Jun. 5, 2009, provisional application No. 61/268,101, filed on Jun. 9, 2009.

(51) Int. Cl.
*G06F 3/0482* (2013.01)
*G06F 3/0484* (2013.01)

(56) References Cited

U.S. PATENT DOCUMENTS

| | | |
|---|---|---|
| 6,362,842 B1 | 3/2002 | Tahara et al. |
| 6,636,244 B1 | 10/2003 | Kelley et al. |
| 6,907,581 B2 | 6/2005 | Noy et al. |
| 7,434,177 B1 | 10/2008 | Ording et al. |
| 7,530,030 B2 | 5/2009 | Baudisch |
| 7,616,191 B2 * | 11/2009 | Matta .................. G06F 1/1626 345/168 |
| 7,992,102 B1 | 8/2011 | De Angelo |
| 8,910,078 B2 | 12/2014 | Sweeney et al. |
| 2004/0075699 A1 * | 4/2004 | Franchi ................ G06F 9/4443 715/860 |
| 2006/0112347 A1 | 5/2006 | Baudisch |
| 2006/0232551 A1 | 10/2006 | Matta |
| 2006/0288314 A1 | 12/2006 | Robertson |
| 2007/0067744 A1 | 3/2007 | Lane et al. |
| 2007/0198953 A1 * | 8/2007 | Baudisch ............ G06F 3/04842 715/856 |
| 2009/0319935 A1 | 12/2009 | Figura |
| 2009/0327963 A1 | 12/2009 | Mouilleseaux |
| 2010/0039382 A1 * | 2/2010 | Kumagai ............. G06F 3/0346 345/158 |
| 2010/0299637 A1 * | 11/2010 | Chmielewski ........ G06F 3/0482 715/834 |

FOREIGN PATENT DOCUMENTS

| | | |
|---|---|---|
| JP | 2006-236143 | 9/2006 |
| JP | 2008-226282 | 9/2008 |

OTHER PUBLICATIONS

Bederson, B.B., "Fisheye Menus," *UIST 2000, ACM Symposium on User Interface Software and Technology, CHI Letters*, 2(2): 217-225.

Cockburn, A. et al., "Human On-Line Response to Visual and Motor Target Expansion," Graphics Interface 2006: 81-87.

Guiard, Y. et al., "Target Acquisition in Multiscale Electronic Worlds," International Journal of Human-Computer Studies, 61(6): 1-29 (2004).

McGuffin, Michael et al., "Acquisition of Expanding Targets," ACM Conference on Human Factors in Computing Systems (CHI) 2002: Changing the World, Changing Ourselves, 4(1): 57-64 (Apr. 20-25, 2002).

McGuffin, Michael J. et al., "Fitts' Law and Expanding Targets: Experimental Studies and Designs for User Interfaces," ACM Transactions on Computer-Human Interaction, 12(4): 388-422 (Dec. 2005).

International Search Report and Written Opinion for PCT/US2010/037197 dated Oct. 19, 2010 "Predictive Target Enlargement."

Notification Concerning Transmittal of International Preliminary Report on Patentability from International Application No. PCT/US2010/037197, dated Dec. 15, 2011 "Predictive Target Enlargement."

* cited by examiner

PREDICTIVE TARGET ENLARGEMENT

RELATED APPLICATION

This application is a continuation of U.S. application Ser. No. 12/793,495, filed Jun. 3, 2010, which claims benefit under 35 U.S.C. § 119 to U.S. Provisional Application Nos. 61/217,934, filed Jun. 5, 2009 and 61/268,101 filed Jun. 9, 2009.

The entire teachings of the above applications are incorporated herein by reference.

BACKGROUND OF THE INVENTION

Generally, a user of a computer system interacts with a graphical computer application by moving a cursor-controlled pointing device such as a mouse, which in turn moves a pointer on a computer screen. The pointer is moved to various graphical user interface (GUI) target objects on the computer screen, such as menus, menu items, and buttons. When a pointer overlays a target object, the target object may initiate an event to which the computer application responds. In the field of human-computer interaction, this type of interaction is generally known as target acquisition.

A user may have difficulties acquiring a target object. Affecting the ease in which a user can acquire the target object are the target object's size and initial proximity to the pointer. A mathematical model of human-computer interaction first published by Paul Fitts in 1954 and known as Fitts's Law predicts the time required to move to a target object as a function of the distance to and the size of the target object. Fitts's Law establishes that at the same distance a smaller target object requires more time to acquire than a larger target object, and a target object that is further away from a mouse pointer requires more time to acquire than a target object of the same size that is closer to a mouse pointer. Thus, target size and distance are often considered when designing computer-user interfaces for easier computer-human interaction.

Target size and distance were considered by Michael McGuffin, et al., *Acquisition of Expanding Targets*, ACM Conference on Human Factors in Computing Systems (CHI) 2002, pp. 57-64. However, McGuffin's approach recommends waiting until the pointer is near to a target object (e.g., has completed 90% of the distance to the target object) before the target object is expanded. Furthermore, McGuffin used a single target object, which models a very simplistic case. In practical applications involving multiple potential targets, McGuffin's approach is deficient, and McGuffin does not provide any indication of how predictive logic might be employed to determine which object to expand.

A technique for expanding targets for acquisition is described by Patrick Markus Baudisch in U.S. Pat. No. 7,530,030, which is assigned to Microsoft Corporation of Redmond, Wash. According to Baudisch's abstract, Baudisch's expanded targets "are generated as Voronoi polygons." The first paragraph of Baudisch's detailed description explains that "targets are [not] obscured by expanded targets, nor [ ] 'shoved aside.'" Moreover, a purpose of Baudisch's invention "is to expand the targets into available display space, [that is by] not impinging upon other targets" (see detailed description, paragraph 5).

Rather than increasing the size of a target object, however, a solution may increase the size of the activation area surrounding the target object, thereby allowing the target object to be selected when the pointer is within a specified distance of the target object. This solution is further described in U.S. Pat. No. 6,636,244, which is assigned to International Business Machines Corporation of Armonk, N.Y.

Although Apple Computer's MAC OS X Dock control does not address an issue with the acquisition of a target object, the Dock control does address the ease of interaction with a target object after the target object is acquired. The Dock control does so by increasing the size of the target object after the pointer overlaps the target object. Adjacent target objects are also dynamically enlarged as the user moves the pointer within the Dock area. U.S. Pat. No. 7,434,177 assigned to Apple, Inc. of Cupertino, Calif. further describes the Dock control.

Drawbacks of current state of the art systems include not allowing possible target objects to overlap, the necessity of moving a pointer (e.g., via a cursor-control I/O device) to a desired target object (or near to it) prior to the target object being enlarged, and being unable to predict which user-interface item is the desired target object. A further drawback is that enlarging GUI objects necessitates the repositioning of other GUI objects. A system or method that addresses these and other drawbacks would greatly enhance current state-of-the-art computerized systems by enabling the acquisition of target objects more quickly and in a more efficient manner.

SUMMARY OF THE INVENTION

An embodiment of the invention is a computer-implemented method of providing a graphical user interface (GUI) on a computer screen. A target object to be selected by a user among various command regions of the GUI is predicted. The target object corresponds to one of the command regions. The command region corresponding to the predicted target object is enlarged to facilitate user selection of the predicted target object.

An activation area of the enlarged command region may also be enlarged. The enlarged command region may also be highlighted Prediction logic may include determining or otherwise detecting a movement of a cursor from a first position to a second position and determining multiple regions based on the first position, with the regions associated with respective command regions. A vector is created based on the detected movement, e.g., from the first position to the second position. A determination is made as to which of the regions intersects the vector. This determination may be made independent of the cursor reaching the target object. The first position may be based on a user command, e.g., a mouse click or other cursor control/input device event.

The vector may be created when the movement exceeds a threshold, e.g., a distance or speed threshold. A distance threshold of 15 pixels may be used.

The movement may be determined only after a cursor control is clicked and held in a clicked state in one embodiment.

The method may further include detecting a second movement of the cursor into a second region adjacent to the region corresponding to the enlarged command region, restoring the formerly enlarged command region to a non-enlarged size, and enlarging a second command region corresponding to the second region.

Predicting may occur substantially before the cursor reaches the target object, e.g., after a distance of only 15 pixels from an initial event.

Enlarging the predicted target object may cause the predicted target object to overlap and/or occlude adjacent command regions.

The method may further include displaying a GUI object, such as a pie menu, on the computer screen. The GUI object may include a number of divisions designating the command regions.

The method may further include detecting entry of the cursor into an activation area of the enlarged command region and performing a computer operation of the enlarged command region corresponding to the target object. The method may further include removing the GUI object from the computer screen. The GUI object may be removed before or after the computer operation is performed.

The GUI object remains displayed only when a mouse button (e.g., right mouse button) is clicked and held in one embodiment. In other words, if the mouse button is released before the cursor is moved over a command region to select that region as a target object, then the GUI object (e.g., pie menu) is removed from the display.

The command regions may be arranged circularly, linearly (e.g., in a vertical or horizontal array), or in a combination thereof (e.g., grid).

Enlarging the predicted target object may enlarge the predicted target object in multiple dimensions, e.g., horizontally as well as vertically.

Another embodiment of the invention is a computer readable medium having stored thereon program instructions which, when executed by a processor, cause the processor to predict a target object to be selected by a user among various command regions of the GUI, the target object corresponding to one of the command regions; and enlarge the command region corresponding to the predicted target object to facilitate user selection of the predicted target object.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention predicts which Graphical User Interface (GUI) object (e.g., a button, an icon) is the object a user intends to acquire. The user may wish to acquire a GUI object to indicate a selection or to initiate a command, by way of non-limiting example. The prediction is based on the direction of motion of a cursor (also referred to herein as a pointer) that is controlled by an input/output (I/O) device such as a mouse, touchpad, pointing stick, or other cursor-control I/O device. An embodiment of the present invention enlarges the predicted target object prior to acquisition and allows the predicted target object to overlap and occlude other adjacent and nearby GUI objects. By predicting and enlarging a target object, the user may more easily acquire the target object and initiate an event to a computer software application.

Figure 1:
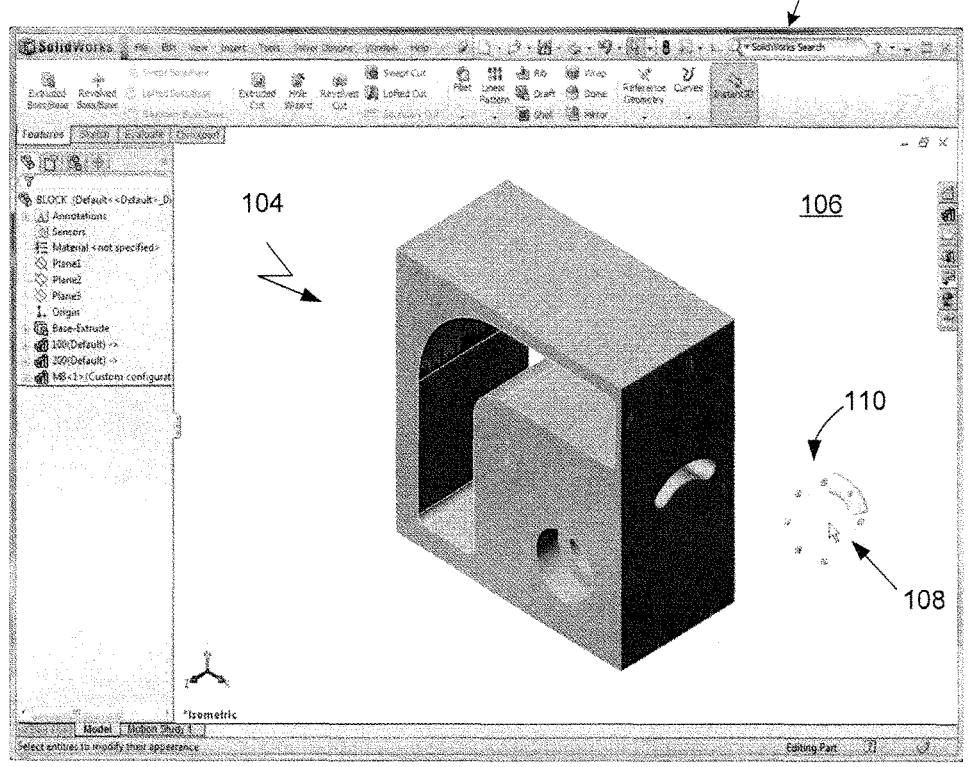
FIG. 1 is an illustration of a computer-generated model and a feature manager portion of a user interface displayed in a window in one embodiment of the present invention.

Referring now to FIG. 1, a window 102 displayed on a computer monitor is shown. The window 102 is generated by exemplary software executed by a computer system, an example of which is later shown with reference to FIG. 7. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model 104.

Typically, a user manipulates a mouse or other cursor-controlled I/O device to select GUI icons, buttons, and other objects that initiate commands in a software application. The location corresponding to the mouse in the modeling portion 106 of the window 102 may be indicated by a pointer 108, which is shown in the center of a pie menu 110 used to initiate commands in the software application.

In an exemplary embodiment, the present invention predicts a GUI target object in a pie menu. A pie menu is a circular menu that surrounds a pointer controlled by an I/O device. A pie menu may be designed as a ring or may be donut-shaped, and has a number of commands in a circular arrangement surrounding the pointer.

Figure 2A:
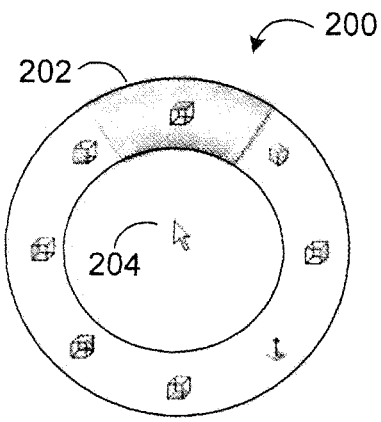
FIGS. 2A-2B are illustrations of a user interface object with different command regions highlighted in one embodiment of the present invention.

Referring to FIG. 2A, a pie menu 200 having eight command icons spaced equally in a circular pattern is shown. In this example embodiment, divisions between the command icon regions are not clearly demarcated until one of the icon regions is highlighted as described herein; in other embodiments, divisions between the command icons are clearly shown to the user whenever the pie menu is displayed thereby explicitly indicating command icon regions. The visually depicted command and the surrounding region (e.g., the highlighted area as shown in FIG. 2A) is herein referred to as a command region or command icon region. The top-view command icon region 202 is directly above the pointer 204 and is highlighted (or otherwise visually identified) to indicate that the direction of motion of the pointer 204 is toward the top-view command region 202, which is predicted to be the target object that will ultimately be acquired according to logic described further herein.

In an embodiment, highlighting the top-view command region 202 indicates that the top-view command region 202 is the predicted target object. In the embodiment shown in FIG. 2A, the entire highlighted area is said to be the predicted target object; in other embodiments, only the graphical depiction of the command (referred to herein as the command icon), and not the surrounding region is considered to be the target object. To illustrate, a command to display the top view of a model may be graphically depicted as a cube with a shaded top; the cube depiction may be considered the target object and not any space surrounding the cube.

Embodiments may initiate the associated command (e.g., show the top view of a model) when the pointer 204 simply enters the highlighted command region 202 or when a mouse button-down event occurs after the pointer 204 enters the highlighted target command region. Embodiments initiating commands simply when the pointer 204 enters the target region typically initiate commands more quickly then embodiments requiring another input event (e.g., a mouse button-down event).

In one embodiment, the pie menu 200 is only displayed when directed by the user (e.g., via pressing a right mouse button), and the target object is regarded as being reached (or acquired) when the pointer 204 has been moved over (or into an activation area encompassing) one of the command regions. A computer operation associated with the target object may then be performed immediately or upon user direction when a button on a cursor-controlled I/O device is pressed. After the computer operation is performed, the pie menu 200 may be removed from the display.

In other embodiments, the pie menu 200 may be displayed automatically without user direction. For example, target prediction logic may automatically begin once the pointer 204 is within a certain distance from one or more command regions.

Figure 2B:
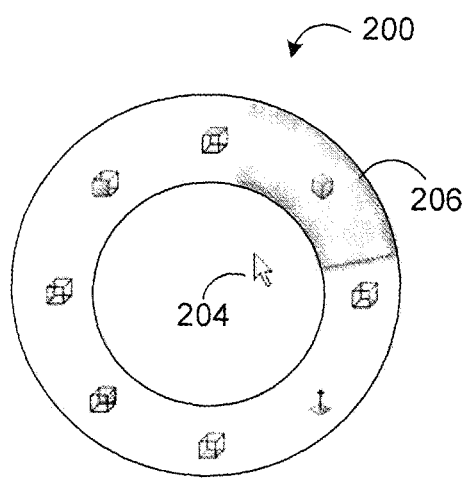

FIG. 2B illustrates the pie menu 200 with the isometric-view command region 206 highlighted. In FIG. 2B, the isometric-view command region 206 may be highlighted because the user changed the direction of motion of the pointer 204 away from the command region corresponding to the top-view command region 202, which is highlighted in FIG. 2A, and toward the region of the pie menu 200 corresponding to the isometric-view command region 206. An embodiment of the present invention thus predicts that the isometric-view command region 206 is the intended target object due to the direction of motion or the location of the pointer, or both.

The present invention predicts the user's intended target object by monitoring the direction of the pointer's movement. Once the target object is predicted, the target object is enlarged to more easily acquire the target object using the pointer 204. Enlarged in this context means increased relative to other command regions thereby creating a visual distinction between the enlarged region and the other regions (which results in easier user selection of the enlarged region). The predicted target object is also allowed to overlap other command regions and partially occlude adjacent command regions.

Referring again to FIG. 2A and FIG. 2B, the command icon regions that are not the target object have no ascertainable boundaries to indicate overall size; whereas the command region that is the target object (i.e., regions 202 and 206, respectively), does have an ascertainable boundary. If the top-view command region 202 and the isometric-view command region 206 were superimposed, the right side of the top-view target object 202 would overlap with the left side of the isometric-view target object 206. The size of a command region varies depending on whether the command region or an adjacent command region is the target object.

Figure 3:
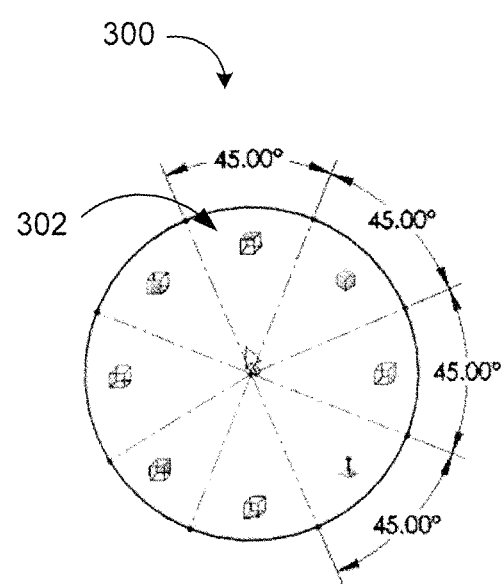
FIG. 3 is an illustration of a division of a user interface object into equally sized areas corresponding to respective command regions in one embodiment of the present invention.

Referring now to FIG. 3, an example of a pie menu 300 having eight command icons is shown. Initially, each command icon region extends along a 45° arc of the circular pie menu 300. (See for example the top-view command region 302.) Once the target object is predicted, the corresponding command icon region is enlarged and becomes the activation area for initiating the computer instruction associated with the command icon.

Figure 4A:
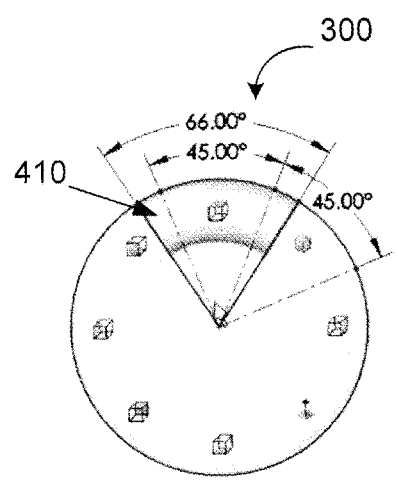
FIGS. 4A-B are illustrations of a user interface object with different command regions enlarged in one embodiment of the present invention.
Figure 4B:
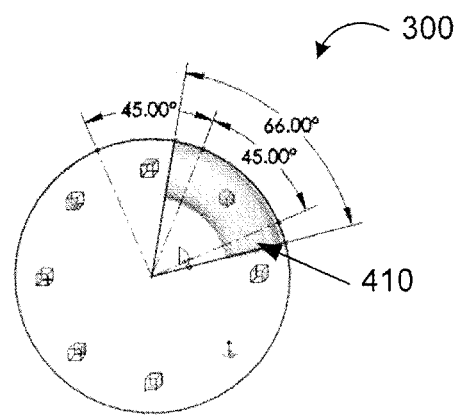

As shown in FIG. 4A and FIG. 4B, the dashed lines show the 45° sectors (i.e., wedge-shaped areas) associated with equally spaced command regions in the menu 300, and the solid lines show an enlarged wedge-shaped region associated with a target object in an embodiment of the present invention. In such an embodiment, a predicted target object is enlarged to a 66° slice of the pie menu. In other embodiments of an eight-icon pie menu, the predicted target region may be enlarged to other values greater than 45°, which may be user-specified values. The two adjacent command icons regions are, in effect, reduced in size using the calculation ((45°−(66°−45°)/2)=34.5°). Due to the 66° target object region 410 that overlaps with adjacent command regions, the user may more easily stay within the predicted target region 410 to acquire the target object (shown highlighted in FIG. 4A and FIG. 4B.) The target object remains the target object until the pointer moves out of the 66° enlarged wedge-shaped region 410. Once the pointer leaves one 66° wedge-shaped region and enters another wedge-shaped region, that other wedge-shaped region becomes the predicted target object region and is enlarged to 66°, while each adjacent wedge-shaped region becomes a 34.5° sector.

In embodiments with other than eight-command pie menus, the size of the slices vary according to the calculation 360°/number of commands, in order to obtain equal slices, and the size of enlarged predicted target regions are based on the equal-slice size. Moreover, embodiments may allow for a user-specified size of a predicted target object, either as an absolute or a relative value.

In some embodiments, one or more adjacent pie regions are reduced in size to compensate for the enlarged region; in other embodiments, all but the enlarged region are reduced in size.

In an embodiment, the prediction logic of the present invention monitors the cursor-controlled device for an initial event, for example, a right mouse button down event. The location of the cursor when the event occurs is used as an initial position. A user interface object (e.g., pie menu 300) is displayed as long as the mouse button is held in a pressed state. The prediction logic tracks the motion of the cursor from the initial position and once the cursor moves by some specified threshold measured in distance, speed, or other attribute of the pointer motion, a vector is formed between the initial position and the current position of the pointer. In one embodiment, a distance threshold of 15 pixels ensures that small inadvertent pointer movements will not cause a prediction to be made. Command regions corresponding to respective command icons are determined, as previously described. A prediction is made as to which command region is the target object based on which command region intersects the vector. This prediction is typically made before the pointer actually reaches the target region, since a prediction may be made after a movement of only a few (e.g., 15) pixels from the starting position. In that sense, the prediction is made independent of a cursor (the pointer) reaching the target object or region.

In some embodiments, the initial event that triggers determination of an initial pointer position need not be a mouse button-down event but rather some other event based on pointer position. For example, a cursor may be monitored for entry into an area defined by a spatial threshold, such as proximity to one of the command regions.

In one embodiment, the predicted target object is enlarged, along with the corresponding activation area. If the cursor moves into an adjacent command region (detected via a similar vector calculation as described), the enlarged predicted target object is restored to a non-enlarged size and the newly predicted target object is enlarged.

Embodiments of the present invention use an overlapping target object to give the user a bigger visual target as well as more leeway when a mouse gesture wanders slightly to either side of the target object, thereby aiding target acquisition because the user may recognize a target more quickly and not be required to have precise mouse gestures. Highlighted, the predicted target object further aids a user in recognizing a target object.

Figure 5:
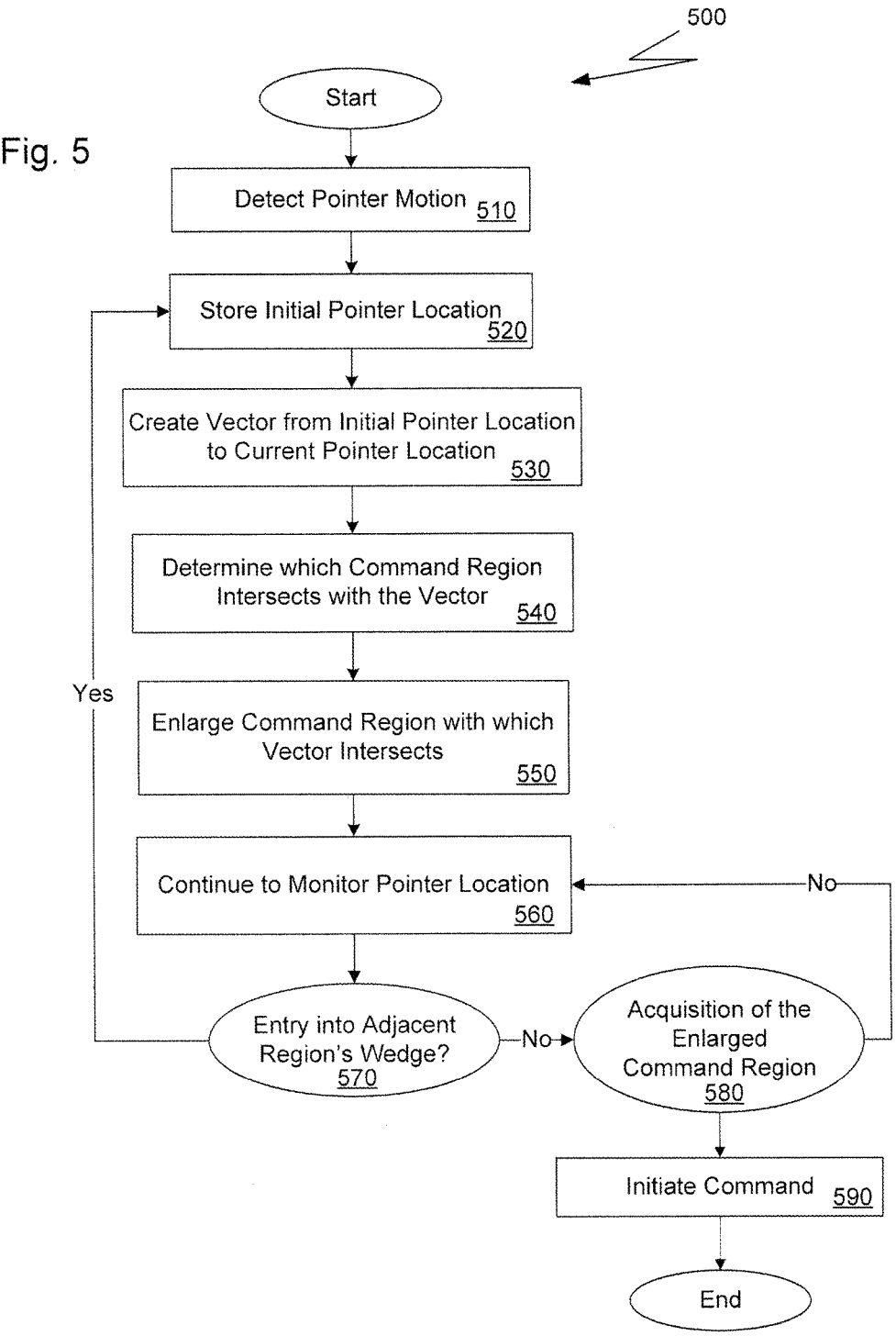
FIG. 5 is a flow diagram illustrating a process of one embodiment of the present invention.

Referring to FIG. 5, a process 500 predicts a GUI target object. Process 500 may begin execution after a computing system receives a mouse button-down event or detects that the pointer is within a specified range of a GUI object, such as a linear arrangement of command icons, by way of non-limiting example. In the first step of process 500, a motion of a pointer beyond a pre-determined threshold (e.g., a distance of 15 pixels) is detected (step 510). Then, an initial pointer location is stored (step 520). Process 500 continues by creating a vector from the initial pointer location to the current pointer location (step 530). In the next step, process 500 determines which command region intersects with the vector (step 540). The determination may be accomplished using an interference detection or a vector analysis calculation known by those skilled in the art. The command region in the direction of the vector is then enlarged (step 550) and overlaps the neighboring command regions. The pointer is monitored (step 560) for entry into adjacent command wedges (step 570), in which case a new initial pointer location is stored, and for acquisition of a target object indicated by the enlarged command region (step 580), in which case a corresponding (or associated) command is initiated (step 590) and process 500 ends.

Advantages of using predictive target embodiments described herein, include giving users early visual feedback about a target, and proving a larger target to acquire, thereby allowing users to interact with a GUI more quickly and with less precision (e.g., the present invention allows for a wandering pointer) yet still acquire the desired result.

Figure 6:
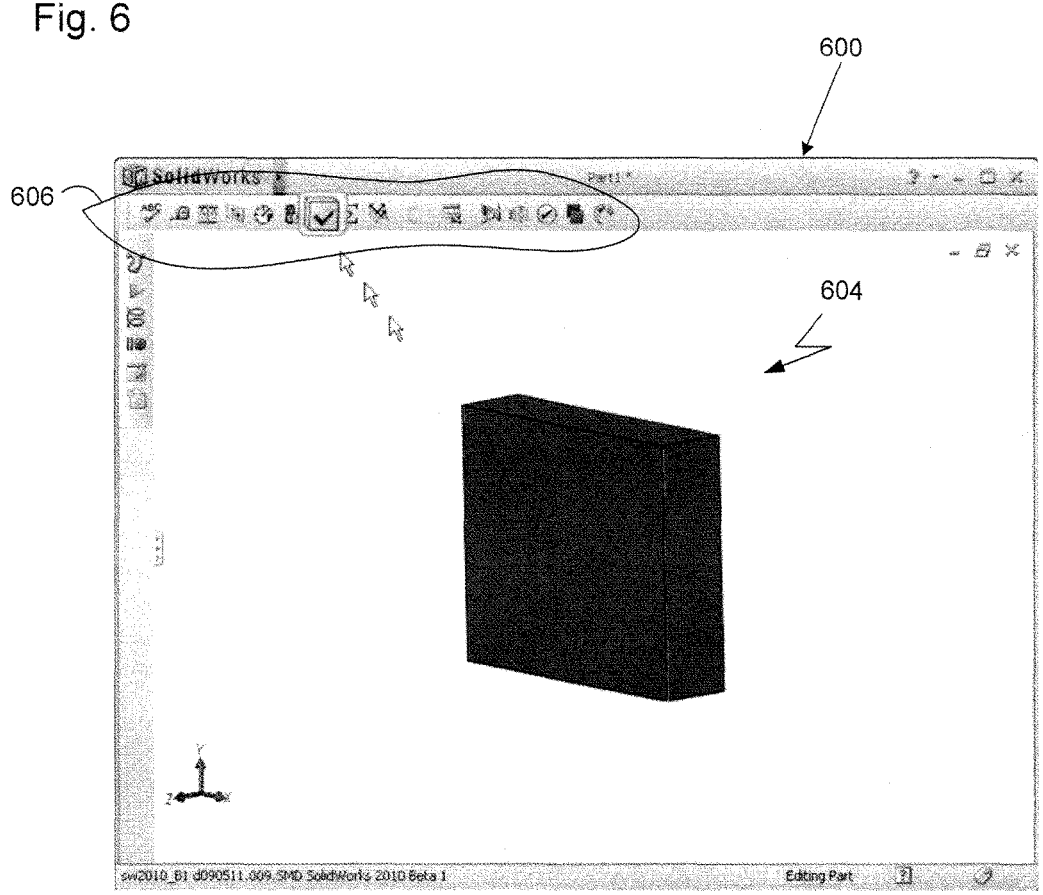
FIG. 6 is an illustration of command regions arranged linearly in a window in one embodiment of the present invention.

Other embodiments of the present invention predict and enlarge other target objects than circularly arranged command regions. For example, FIG. 6 illustrates a linear arrangement of GUI controls arranged as a toolbar 606. Embodiments of the present invention may predict which of the command regions in the toolbar 606 is a target object and enlarge the corresponding command region. From an initial pointer position, which may be computed as the location of the pointer when the pointer is within a specified distance of the toolbar 606, edges are extended to the extents of a command region in the toolbar 606, and thereby a wedge-shaped area is formed. In this way, a wedge-shaped area is formed similar to the wedge-shaped areas illustrated in of FIG. 3. Similar wedge-shaped areas are formed for each command region in a fan-shaped configuration.

Unlike the case of a circular arrangement of icons, wedge-shaped areas corresponding to linearly arranged icons are not equal in size. However, similar principles regarding prediction are employed. After a threshold has been reached (e.g., distance from initial cursor position or pointer speed), a target object is predicted based on an intersection of a calculated vector between the initial pointer position and the current pointer position with one of the command regions. The command region that is the predicted target object is enlarged (and highlighted in some embodiments), and may overlap and occlude nearby command regions. The command region may be enlarged in multiple dimensions (e.g., vertically as well as horizontally), or in a single dimension.

In some embodiments, a target object is predicted based on an intersection of two vectors rather than an intersection of a vector with a command region. For example, in one embodiment, a first vector is determined based on an initial pointer location and a current pointer position. In the case of a horizontal toolbar, by way of non-limiting example, a second vector is defined by a left corner (or edge) of a left-most command region (e.g., toolbar button) and a right corner (or edge) of a right-most command region. That is, the second vector extends horizontally across the toolbar. The second vector is broken down into segments, one for each toolbar button, with each segment being as long as the corresponding toolbar button is wide. In some embodiments, an enlarged button has a longer vector segment than non-enlarged segments, and adjacent toolbar buttons (e.g., GUI buttons on each side of an enlarged button) have segments that are smaller than other non-enlarged toolbar buttons because the adjacent buttons are partially obscured by the enlarged button. The two vectors intersect at a specific location. A command region is predicted as a target object based upon which segment of the second vector is intersected by the first vector.

An alternative embodiment of the present invention does not involve re-calculating pointer positions as often as previously described herein. In this alternative embodiment, which may be used with linearly arranged command regions, by way of non-limiting example, an initial pointer position is not determined based upon a mouse button-down event. Rather, the pointer is monitored as it is moved across the screen. Also, once the pointer is positioned over a command region, a corresponding command is not immediately initiated in this embodiment. Rather, the command is only initiated when a mouse button-down event is detected. Furthermore, once the pointer is positioned over an enlarged command region, a vector does not have to be constantly updated as the pointer position changes; rather, as the pointer moves along the toolbar, only the current position of the pointer is checked and used to determine whether the pointer is still over a particular enlarged command region or moved over another command region, which becomes the new enlarged command region. A command is initiated only when a mouse button-down event is detected while the pointer is within the enlarged command region. Thus in this embodiment, no vector calculations are needed once the cursor is positioned within the overall toolbar area.

In addition to predicting which of a number of command regions in a linear arrangement (e.g., a toolbar) is a target object, embodiments of the present invention predict and resize isolated controls such as pane splitter/resize controls and dialog box command buttons. In general, embodiments of the present invention apply to any GUI control that can be predicted as an acquisition target based on the direction of motion of a pointer controlled by an I/O device. In addition, a user can set a property to specify the amount by which targets will be enlarged by the invention.

In one embodiment, a data structure residing in computer memory is used to store information related to command and associated regions, as well as an enlarged target region. The data structure keeps track of which region is the target region.

Figure 7:
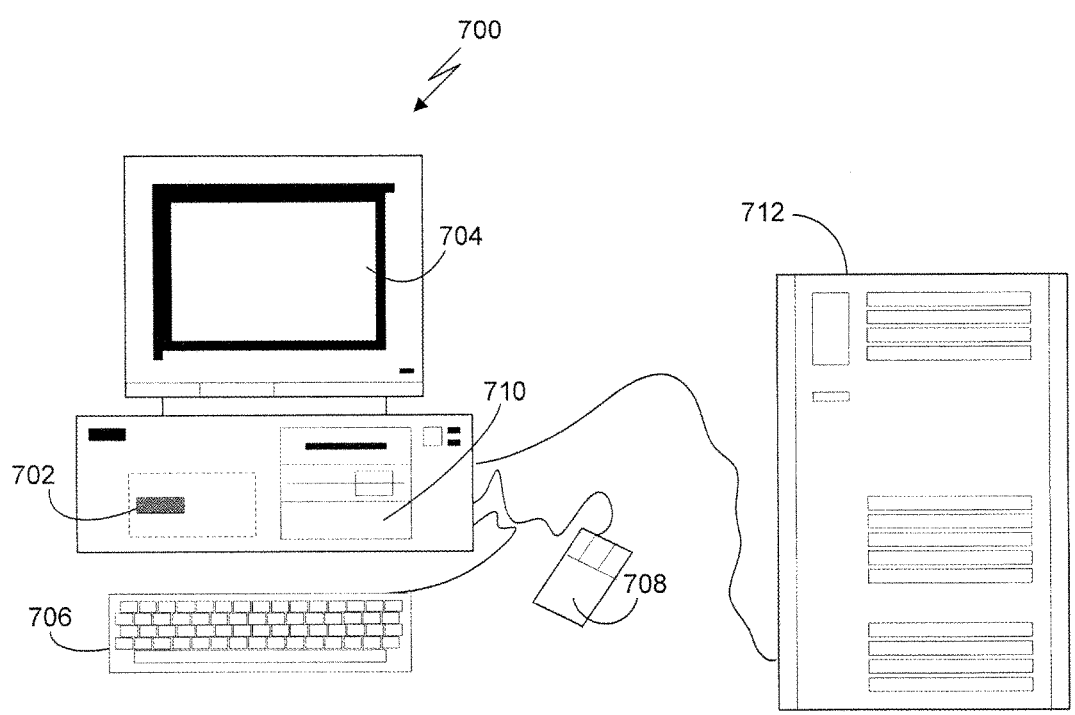
FIG. 7 is a schematic diagram of a computer system in which embodiments of the present invention are implemented.

Referring now to FIG. 7, a computerized system 700 is shown and includes a CPU 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include a Pentium-based processor. The mouse 708 may have conventional left and right buttons that the user may press to issue a command to a software program being executed by the CPU 702. As an alternative or in addition to the mouse 708, the computerized system 700 can include a pointing device such as a trackball, touch-sensitive pad, or pointing device and buttons built into the keyboard 706. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft® Windows® 2000, Windows XP, Windows Vista®, Windows 7, UNIX®, Linux, or Mac OS® operating systems.

Additional computer processing units and hardware devices (e.g., graphic accelerator processors, rapid prototyping, video, and printer devices) may be included in the computerized system 700. Furthermore, the computerized system 700 may include network hardware and software thereby enabling communication to a hardware platform 712, and facilitating communication between numerous computer systems that include a CPU and a storage system, among other computer components.

Computer software may be stored on the storage device 710 and loaded into and executed by the CPU 702. The computer software implements aspects of the invention described herein. The CPU 702 uses the computer monitor 704 to display a GUI and other aspects thereof as described. Using the keyboard 706 and the mouse 708, the user can interact with the GUI. The CPU 702 accepts and processes input from the keyboard 706 and mouse 708. The CPU 702 processes input and makes corresponding and appropriate changes to that which is displayed on the computer monitor 704 as commanded by the computer software. In one embodiment, the computer software is based on a modeling system that may be used to construct a 3D model.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Advantages of the current invention include predicting the desired target object prior to a pointer reaching the target object, and enlarging the target object prior to the pointer reaching the target object. Predicting a GUI target in the manner described herein realizes time-saving advantages such as enabling the user to quickly select a target object. Predictive target enlargement allows for easier and faster target acquisition, thereby enabling users to work more efficiently on computer systems that employ the present invention. Moreover, working more efficiently is likely to enhance the user experience. Furthermore, overlapping a target object with adjacent objects provides a user the advantage of not being required to have precise mouse gestures. Highlighted, the predicted target object further aids a user in recognizing a target object.

While this invention has been particularly shown and described with references to example embodiments thereof, it will be understood by those skilled in the art that various changes in form and details may be made therein without departing from the scope of the invention encompassed by the appended claims. For example, those skilled in the art will know how to implement the systems and methods described herein to various types of user interfaces, including touch screen interfaces, keyboard activated interfaces, mouse interfaces, and other cursor controlled interfaces. Further, implementations may change the order in which operations are performed. Moreover, depending on the needs of an implementation, particular operations described herein may be implemented as a combined operation, eliminated, added to, or otherwise rearranged.

Additionally, embodiments may be used with various arrangements of icons (GUI objects), including linear arrangements (horizontal, vertical, or diagonal), circular or elliptical arrangements, or combinations thereof (e.g., grid arrangements). Multiple regions may intersect a vector used for prediction (e.g., in the case of a grid layout, a three-dimensional GUI arrangement, or a single row of command regions when multiple regions might overlap one another). When multiple regions intersect a pointer's direction vector, a determination may be made as to which of the intersecting regions is most likely to correspond to the target object. In some embodiments (e.g., a grid layout a three-dimensional GUI layout, or a layout of concentric circles), multiple command regions may be determined to be target objects and enlarged and/or highlighted (e.g., a near icon and a far icon along a similar direction defined by the vector used for prediction). Multiple regions and activation areas may also be enlarged in that case.

Also the above description refers to a pointer. Other cursors, locators, indicators and the like are suitable and similarly treated in various embodiments.

What is claimed is:

1. A computer-implemented method of providing a graphical user interface (GUI) on a computer screen, the method comprising:

displaying the GUI on the computer screen for user interaction with a computer, the GUI being formed of a plurality of user interactive command regions arranged extended along a curve and at various times positioned with respect to a pointer such that the pointer is equidistant from two or more or all of the command regions, each command region corresponding to one respective computer operation initiated upon user selection;

predicting a target object to be selected among the command regions of the GUI, the target object corresponding to one of the command regions, wherein at various times the pointer is equidistant from two or more or all of the command regions, the predicting includes: (i) detecting a direction of motion of the pointer, and (ii) automatically determining one of the corresponding command regions from among the plurality of command regions based on the detected direction of motion of the pointer; and enlarging the determined one command region corresponding to the predicted target object to facilitate user acquisition and selection of the predicted target object, wherein said enlarging occurs before the pointer reaches the predicted target object and before the predicted target object has been acquired.

2. The computer-implemented method of claim 1, further including enlarging an activation area of the enlarged command region.

3. The computer-implemented method of claim 1, further including highlighting the enlarged command region.

4. The computer-implemented method of claim 1, wherein predicting being based on direction of motion of the pointer includes:

creating a vector based on a detected movement of the pointer from a first position to a second position; and determining one of the plurality of command regions that intersects the vector, said determining being independent of the pointer reaching the target object.

5. The computer-implemented method of claim 4, wherein the first position is calculated upon receiving an input device event.

6. The computer-implemented method of claim 4, wherein the vector is created when the movement exceeds a threshold.

7. The computer-implemented method of claim 6, wherein the threshold is a distance in pixels.

8. The computer-implemented method of claim 4, further including:

detecting a change in direction of movement of the pointer toward a second region adjacent to the region corresponding to the enlarged command region;

restoring the enlarged command region to a non-enlarged size; and enlarging a second command region corresponding to the second region.

9. The computer-implemented method of claim 1, wherein enlarging the predicted target object causes the predicted target object to overlap adjacent command regions.

10. The computer-implemented method of claim 1 wherein the GUI includes a number of divisions separating the command regions.

11. The computer-implemented method of claim 1, further including:

detecting entry of the pointer into an activation area of the enlarged command region; and performing the one respective computer operation corresponding to the enlarged command region.

12. A non-transitory computer-readable medium having stored thereon program instructions that when executed by a processor cause the processor to:

predict a target object among a plurality of user interactive command regions of a GUI displayed on a computer screen, the target object corresponding to one of the command regions, the GUI being formed of the plurality of command regions arranged extended along a curve and at various times positioned with respect to a pointer such that the pointer is equidistant from two or more or all of the command regions, each command region corresponding to one respective computer operation initiated upon user selection of the command region, the predicting includes: (i) detecting a direction of motion of the pointer, and (ii) automatically determining one of the corresponding command regions from among the plurality of command regions based on the detected direction of motion of the pointer; and enlarge the determined one command region corresponding to the predicted target object to facilitate user acquisition and selection of the predicted target object, wherein said processor enlarges the determined one command region before the pointer reaches the predicted target object and before the predicted target object has been acquired.

13. The computer-readable medium of claim 12 wherein program instructions cause the processor to perform any one or combination of:

enlarge an activation area of the enlarged command region;

highlight the enlarged command region; and enlarge the command region of the predicted target object in a manner causing the enlarged command region to overlap one or more other command regions.

14. The computer-readable medium of claim 12 wherein the processor further:

detects entry of the pointer into an activation area of the enlarged command region; and performs the one respective computer operation corresponding to the enlarged command region.

15. The computer-readable medium of claim 12 wherein the processor predicts the target object based on direction of motion of the pointer by:

creating a vector based on a detected movement of the pointer from a first position to a second position; and determining one of the command regions that intersects the vector, said determining being independent of the pointer reaching the target object.

16. The computer-readable medium of claim 15 wherein program instructions cause the processor to further perform any one or combination of:

calculate the first position as a function of receiving an I/O event;

create the vector when the detected movement exceeds a threshold; and restore the enlarged command region to a non-enlarged size and enlarge a second command region based on detecting a subsequent movement of the pointer toward the second command region.

17. A computer system comprising:

a processor executing a graphical user interface (GUI) displayable on a computer screen, the GUI being formed of a plurality of user interactive command regions arranged extended along a curve and at various times positioned with respect to a cursor such that the cursor is equidistant from two or more or all of the command regions, each command region corresponding to one respective computer operation of the processor and initiated upon user selection of the command region; and the processor further executing a processing unit operatively coupled to the GUI, the processing unit:
(i) predicting a target object among the command regions of the GUI, the target object corresponding to one of the command regions, wherein at various times the cursor is equidistant from two or more or all of the command regions, the predicting includes:
(i) detecting a direction of motion of the cursor, and
(ii) automatically determining one of the corresponding command regions from among the plurality of command regions based on the detected direction of motion of the cursor, and
(ii) enlarging the one command region corresponding to the predicted target object in a manner enhancing user recognition of and selectability of the predicted target object, and the processing unit performing the one respective computer operation corresponding to the enlarged command region in response to one of: (a) entry of the cursor into an activation area of the enlarged command region and (b) upon receiving an input device event after the cursor enters into the activation area of the enlarged command region, wherein said enlarging occurs before the cursor reaches the predicted target object and before the predicted target object has been acquired.

18. A computer system as claimed in claim 17 wherein the processing unit further provides any one or combination of:
enlarging an activation area of the enlarged command region;
highlighting the enlarged command region;
enlarging the command region of the predicted target object in a manner overlapping adjacent command regions; and
restoring the enlarged command region and enlarging a second command region.

19. A computer system as claimed in claim 17 wherein the processing unit predicting the target object based on direction of motion of the cursor includes the processing unit:
creating a vector based on a detected movement of the cursor from a first position to a second position; and
determining one of the command regions that intersects the vector, said determining being independent of the cursor reaching the target object.

* * * * *